No. 680,891. Patented Aug. 20, 1901.
W. C. SMITH.
AUTOMOBILE.
(Application filed Feb. 27, 1901.)

(No Model.) 2 Sheets—Sheet 1.

Witnesses: Inventor:
M. Lynch
John Lynch Wm. Colt Smith

THE NORRIS PETERS CO., PHOTO-LITHO., WASHINGTON, D. C.

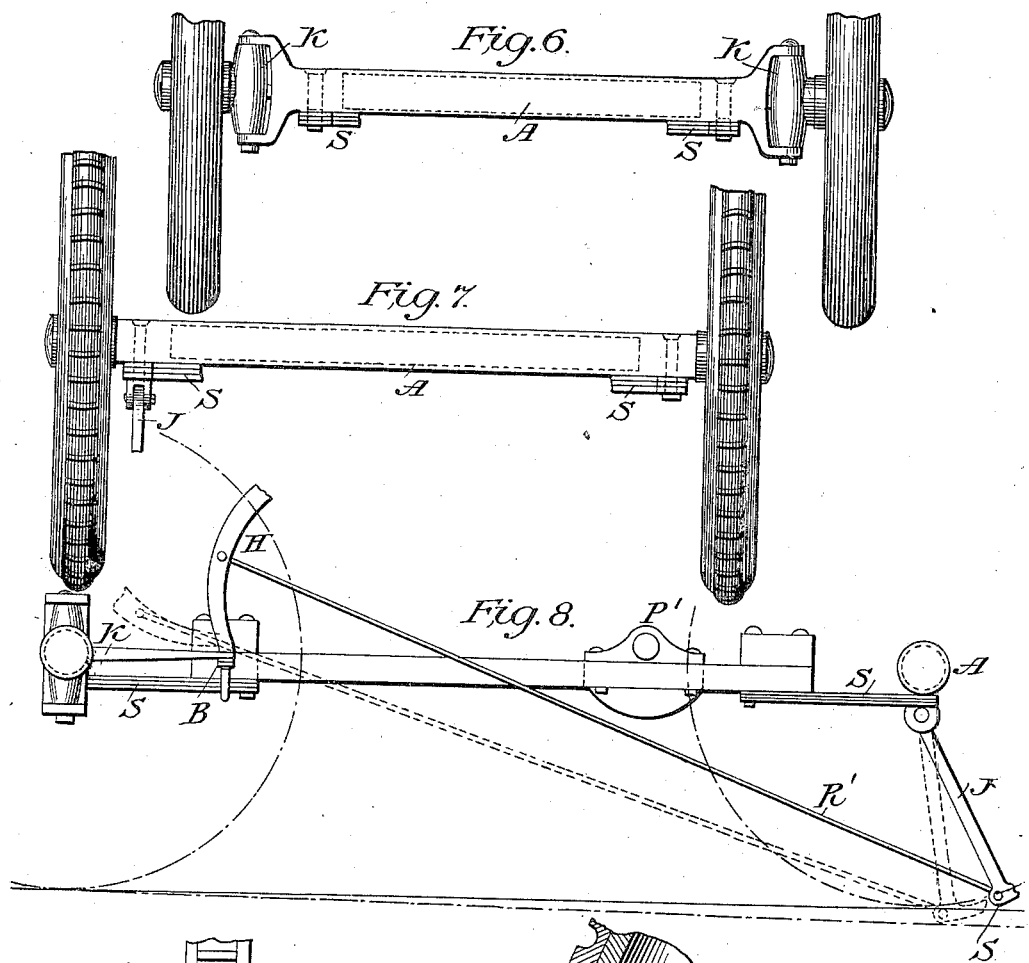

UNITED STATES PATENT OFFICE.

WILLIAM COBB SMITH, OF MEDFORD, MASSACHUSETTS.

AUTOMOBILE.

SPECIFICATION forming part of Letters Patent No. 680,891, dated August 20, 1901.

Application filed February 27, 1901. Serial No. 49,053. (No model.)

*To all whom it may concern:*

Be it known that I, WILLIAM COBB SMITH, a citizen of the United States, residing at Medford, in the county of Middlesex and State of Massachusetts, have invented new and useful Improvements in Automobiles, of which the following is a specification.

My invention relates to improvements in automobiles, and more particularly to that class in which hydrocarbon-motors are used.

The principal object of the invention is to provide a simple means for operating a hydrocarbon-automobile without the usual complicated clutch between the motor and propelling-wheel.

A further object is to provide a silent and positive gearing with the propelling-wheel peripheries.

As far as I am aware the following are novel features in an automobile—viz., a propelling-wheel-lifting device; a toothed gear on the power-shaft adapted to mesh with a propelling-wheel toothed rubber tire; a spring running-gear frame arranged in such a manner as to do away with reaches, joints, and trussed axles; a bail-shaped handle-bar connected with the steering-knuckles, thus avoiding the usual number of joints and levers, and a pneumatic tire of peculiar construction having resilient as well as durable qualities.

Figure 1:
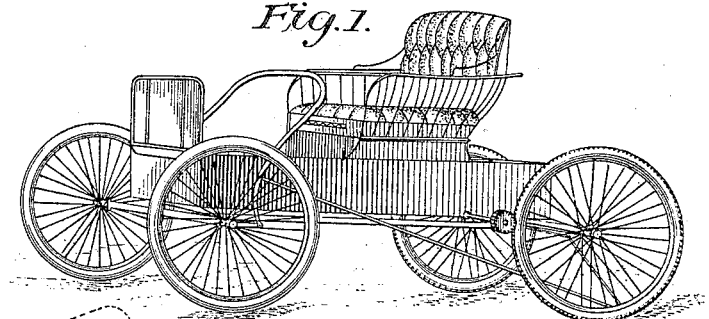
Figure 2:
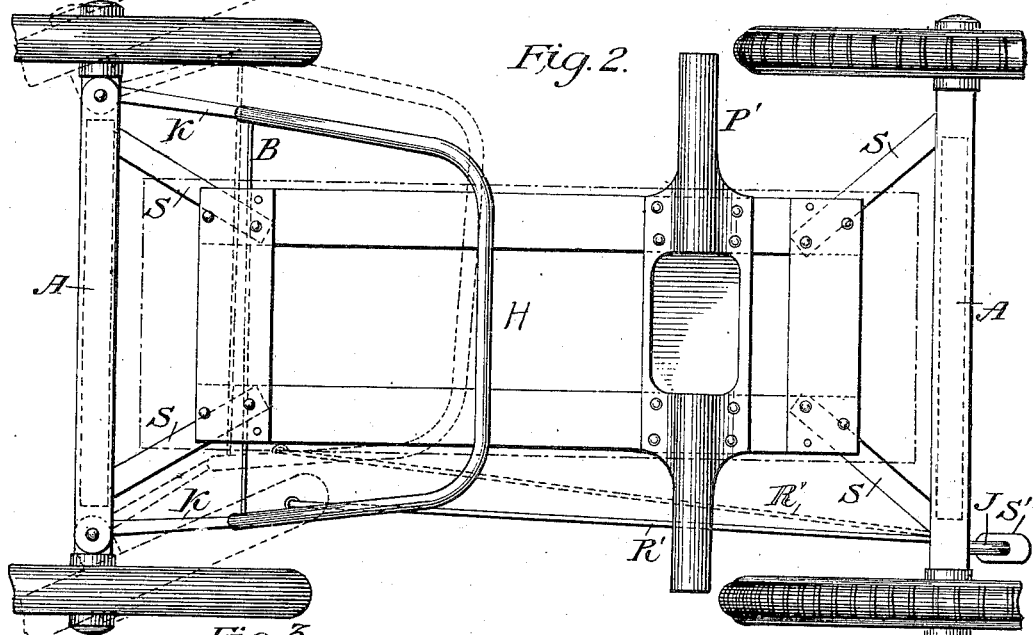
Figure 3:
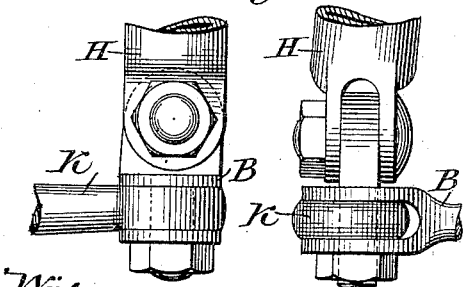
Figures 4, 5:
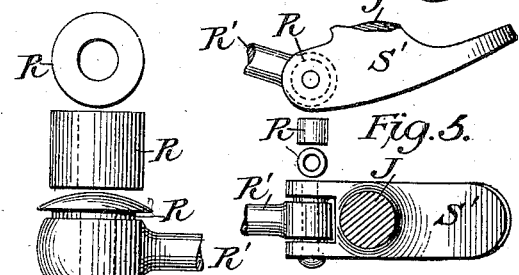

In the drawings, Figure 1 is a perspective view. Fig. 2 is a plan of the running-gear, showing in dotted lines the action of the steering mechanism. Fig. 3 is a side and rear view of the handle-bar and steering-knuckle compound joint. Fig. 4 is a plan view. Fig. 5 is a side and plan view. Fig. 6 is a front view of the front axle; Fig. 7, a rear view of the rear axle, and Fig. 8 a side view. Fig. 9 is a front view of the driving-gear and propelling-wheel tire. Fig. 10 is a cross-section of the tire; Fig. 11, a side view, and Fig. 12 a vertical section.

In the drawings the same letters refer to like parts.

A A represent the axles, which are simply straight steel tubes with solid extremities.

S S S S are straight triple-leaf springs, each of which is secured to the axle by a single bolt and to the wooden rectangular running-gear frame by a single bolt and by a bolt-head at one side to prevent side movement. Since the wheels at each extremity of an axle are in parallel planes, the slight rotation of the axles caused by the spring movement does not vibrate the wheels, as would be the case were they "set under" as in horse-vehicles. The diagonal arrangement of the springs allows connection near the extremities of the axles. Truss-axles, reaches, and joints to overcome torsional strains are not needed with this construction.

P' is the power-shaft bearing and is bolted to the wooden rectangular frame, as shown. Only an outer end of the power-shaft P is shown, as a differential gear or any suitable connection with a motor may obviously be used. The steering-knuckles K K, handle-bar H, and connecting-rod B are pivoted together by compound joints, as shown. At one side of the handle-bar is pivoted the rod R', which extends rearwardly and is pivoted to the lower extremity S' of an arm J, pivoted under the rear axle just inside the propelling-wheel. The pivots at each end of R' are provided with rubber bushings R R to insure silence of operation.

The propelling-wheel-lifting device is operated as follows: When the vehicle is at rest, H is in the forward position and does not obstruct access to the vehicle, J is in a nearly vertical position, and S' at its lower extremity is in contact with the road-surface instead of the adjacent propelling-wheel. Now the operator may start the motor by revolving the free propelling-wheel with the hand. It is obvious that with a differential gear in the power-shaft the free propelling-wheel may move independent of the other wheel. On mounting the vehicle H is brought by the operator to its rear position, when the vehicle starts by its own gravity. By raising H S' comes in contact with the road-surface and at first acts as a brake in retarding the vehicle. By moving H still farther the propelling-wheel is freed and the weight is supported by J, which has again nearly approached the vertical position. It is seen that S' performs the function of a brake as well as a support-bearing. It is also seen that H by transverse and longitudinal movements steers, starts, and stops the vehicle. When H is thrown forward to a stop, it is locked in position, since R' is then below the pivot at the extremity of H and rests on B. H is unlocked simply by rearward movement of itself by the operator. No heavy balance-wheel is needed in the motor, as the propelling-wheel serves this purpose.

The propelling-wheel-lifting device is proposed for hydrocarbon-automobiles in general and of course is not to be confined to any particular construction. As far as I am aware I am the first to free the propelling-wheel in order to start the motor. The usual power-transmission gears may be used in conjunction with the propelling-wheel-lifting device; but the gear shown in the drawings and which constitutes a part of my invention has points of merit—viz., silence of operation, positive action, and simplicity of construction. This gearing differs from common tooth-gearing owing to the flexibility of the propelling-wheel tires. Friction is thus avoided, as the teeth of the tire do not slide, but rock into contact and conform to the curvature of the gear. A number of teeth are also in full contact at the same time. In common gearing the teeth slide during the entire contact, as is well known. By examining Fig. 11 it will be seen that the bending of the tire overcomes this objection and theoretically the contact has no sliding friction. The gearing operates silently, positively, and without friction. No lubrication is needed and perfect construction or delicate adjustment is not necessary. By gearing with the propelling-wheel peripheries the lightest and highest speed-motor may be used.

I am aware that a toothed elastic tire in general is not new. The tire herein shown and claimed, however, has a conformation and properties which are thought to be novel. A common thick pneumatic tire is not resilient, but durable; but by forming transverse teeth in the periphery the tire is divided into resilient and durable portions, the flexible properties being confined to the thin portions and the wearing properties to the thick portions. Any construction of the tire to secure teeth may be employed. A peripheral band cemented to a common tire is the construction shown. The pressure of the gear on the tire is adapted to vary automatically as the load and as the grade of the road-bed. As the weight in the vehicle is increased the internal air-pressure of the tire increases and the tire presses with greater force against the gear, and vice versa. In ascending grades the weight of the vehicle is thrown more on the rear wheels and the pressure is increased, as before.

Having thus described my invention, what I claim, and desire to secure by Letters Patent, is—

1. In an automobile, a suitable running-gear including a propelling-wheel and a steering mechanism, a power-shaft connected with and adapted to revolve faster than the propelling-wheel, a propelling-wheel-lifting device, and a suitable carriage-body adapted to the conveyance of persons or goods.

2. In an automobile, a suitable running-gear including a propelling-wheel and a steering mechanism, a power-shaft connected with and arranged to run faster than the propelling-wheel, a suitable carriage-body, and a propelling-wheel-lifting device adapted to be controllable by an operator in the body.

3. In an automobile, a suitable running-gear including a propelling-wheel and steering mechanism, a power-shaft connected with and arranged to run faster than the propelling-wheel, a suitable carriage-body, a propelling-wheel-lifting device adapted to be controlled by an operator in the body, said device comprising a longitudinally-swinging arm pivoted in the running-gear near the propelling-wheel, said arm having a shoe at its lower extremity, and to which arm, when in a substantially vertical position, the weight is adapted to be transferred from the propelling-wheel, thus freeing the latter from the road-surface.

4. In an automobile, a suitable running-gear including a propelling-wheel and steering mechanism, a power-shaft connected with and arranged to run faster than the propelling-wheel, a suitable carriage-body, a propelling-wheel-lifting device adapted to be controllable by an operator in the body, said device comprising a longitudinally-swinging arm pivoted in the running-gear near the propelling-wheel, said arm extending downwardly and beyond the propelling-wheel periphery, whereby, when in a substantially vertical position the arm acts as a support instead of the propelling-wheel, and a forwardly-extending rod pivoted at its rear extremity to said arm and at its forward extremity to a handle-bar, said bar being bail-shaped and pivoted at either extremity to the extremities of a rod connecting the steering axle-knuckles provided in said steering mechanism.

5. In an automobile, a suitable running-gear including a steering mechanism and a propelling-wheel provided with a toothed elastic tire, a power-shaft connected with and arranged to run faster than the propelling-wheel, a propelling-wheel-lifting device, a suitable carriage-body, and a toothed driving-gear in peripheral contact with said tire.

6. In an automobile, a suitable running-gear including a steering mechanism and a propelling-wheel provided with a toothed elastic tire, a power-shaft connected with and arranged to run faster than the propelling-wheel, a propelling-wheel-lifting device, a suitable carriage-body, a toothed driving-gear in peripheral contact with said tire, and said driving-gear adapted to compress the tire, whereby a number of teeth are in contact at the same time.

7. In an automobile, a suitable running-gear including a steering mechanism and a propelling-wheel provided with a toothed elastic tire, a power-shaft connected with and arranged to run faster than the propelling-wheel, a propelling-wheel-lifting device, a suitable carriage-body, a toothed driving-gear in peripheral contact with said tire, and said driving-gear adapted to compress the said tire with a variable pressure, being automatically governed by the weight or load in the body and by the grade of the road-bed.

8. In an automobile, a suitable running-gear including a steering mechanism and a propelling-wheel, a power-shaft connected with and adapted to run faster than the propelling-wheel, a propelling-wheel-lifting device, a suitable carriage-body adapted to the conveyance of persons or goods, said running-gear provided with straight tubular axles, diagonally-arranged straight leaf-springs bolted near the ends of the axles and to a rectangular frame adapted to support the body, a power-shaft bearing bolted to said frame, a power-shaft adapted to run in said bearing and provided with toothed gears at each end thereof, toothed pneumatic tires on the propelling-wheels adapted to mesh with said gears, the teeth of the tires being formed transversely in their peripheries, the teeth being thick durable portions in the tire-tube, and the intermediate portions being thin and resilient, all substantially as and for the purposes set forth.

In testimony whereof I affix my signature in presence of two witnesses.

WM. COBB SMITH.

Witnesses:
FREDERIC A. HARMON,
W. C. ROCKWELL.